United States Patent
Wolrich et al.

(10) Patent No.: US 7,895,239 B2
(45) Date of Patent: *Feb. 22, 2011

(54) QUEUE ARRAYS IN NETWORK DEVICES

(75) Inventors: Gilbert Wolrich, Framingham, MA (US); Mark B. Rosenbluth, Uxbridge, MA (US); Debra Bernstein, Sudbury, MA (US)

(73) Assignee: Intel Corporation, Santa Clara, CA (US)

( * ) Notice: Subject to any disclaimer, the term of this patent is extended or adjusted under 35 U.S.C. 154(b) by 2014 days.

This patent is subject to a terminal disclaimer.

(21) Appl. No.: 10/039,289

(22) Filed: Jan. 4, 2002

(65) Prior Publication Data

US 2003/0131022 A1    Jul. 10, 2003

(51) Int. Cl.
G06F 17/30 (2006.01)
G06F 3/00 (2006.01)
G06F 13/36 (2006.01)
H04L 12/28 (2006.01)

(52) U.S. Cl. .................. 707/799; 707/813; 710/310; 710/54; 370/412

(58) Field of Classification Search ............ 707/1–5, 707/100–104.1, 205–206, 799, 813; 711/108, 711/154–160, 141–144, 136, 109, 113–115; 717/125–127; 709/220–238; 370/412–417; 710/53–54, 56, 22, 310

See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,792,441 A | 2/1974 | Wymore et al. | |
| 3,940,745 A | 2/1976 | Sajeva | |
| 4,130,890 A | 12/1978 | Adam | |
| 4,400,770 A | 8/1983 | Chan et al. | |
| 4,514,807 A | 4/1985 | Nogi | |
| 4,523,272 A | 6/1985 | Fukunaga et al. | |
| 4,745,544 A | 5/1988 | Renner et al. | |

(Continued)

FOREIGN PATENT DOCUMENTS

EP    0 379 709    8/1990

(Continued)

OTHER PUBLICATIONS

Eric A Brewer et al., Remote queue: exposing message queues for optimization and atomicity, appears in SPAA '95 Santa Barbara, CA pp. 1-13.*

(Continued)

*Primary Examiner*—Srirama Channavajjala
(74) *Attorney, Agent, or Firm*—Blakely, Sokoloff, Taylor & Zafman LLP

(57) ABSTRACT

A queue descriptor including a head pointer pointing to the first element in a queue and a tail pointer pointing to the last element in the queue is stored in memory. In response to a command to perform an enqueue or dequeue operation with respect to the queue, fetching from the memory to a cache only one of either the head pointer or tail pointer and returning to the memory from the cache portions of the queue descriptor modified by the operation.

7 Claims, 7 Drawing Sheets

U.S. PATENT DOCUMENTS

| | | | |
|---|---|---|---|
| 4,866,664 A | 9/1989 | Burkhardt, Jr. et al. | |
| 5,140,685 A | 8/1992 | Sipple et al. | |
| 5,142,683 A | 8/1992 | Burkhardt, Jr. et al. | |
| 5,155,831 A | 10/1992 | Emma et al. | |
| 5,155,854 A | 10/1992 | Flynn et al. | |
| 5,168,555 A | 12/1992 | Byers et al. | |
| 5,173,897 A | 12/1992 | Schrodi et al. | |
| 5,185,861 A | 2/1993 | Valencia | |
| 5,255,239 A | 10/1993 | Taborn et al. | |
| 5,263,169 A | 11/1993 | Genusov et al. | |
| 5,268,900 A * | 12/1993 | Hluchyj et al. | 370/429 |
| 5,347,648 A | 9/1994 | Stamm et al. | |
| 5,367,678 A | 11/1994 | Lee et al. | |
| 5,390,329 A | 2/1995 | Gaertner et al. | |
| 5,392,391 A | 2/1995 | Caulk, Jr. et al. | |
| 5,392,411 A | 2/1995 | Ozaki | |
| 5,392,412 A | 2/1995 | McKenna | |
| 5,404,464 A | 4/1995 | Bennett | |
| 5,404,482 A | 4/1995 | Stamm et al. | |
| 5,432,918 A | 7/1995 | Stamm | |
| 5,448,702 A | 9/1995 | Garcia, Jr. et al. | |
| 5,450,351 A | 9/1995 | Heddes | |
| 5,452,437 A | 9/1995 | Richey et al. | |
| 5,459,842 A | 10/1995 | Begun et al. | |
| 5,463,625 A | 10/1995 | Yasrebi | |
| 5,467,452 A | 11/1995 | Blum et al. | |
| 5,517,648 A | 5/1996 | Bertone et al. | |
| 5,542,070 A | 7/1996 | LeBlanc et al. | |
| 5,542,088 A | 7/1996 | Jennings, Jr. et al. | |
| 5,544,236 A | 8/1996 | Andruska et al. | |
| 5,550,816 A | 8/1996 | Hardwick et al. | |
| 5,557,766 A | 9/1996 | Takiguchi et al. | |
| 5,568,617 A | 10/1996 | Kametani | |
| 5,574,922 A | 11/1996 | James | |
| 5,592,622 A | 1/1997 | Isfeld et al. | |
| 5,613,071 A | 3/1997 | Rankin et al. | |
| 5,613,136 A | 3/1997 | Casavant et al. | |
| 5,623,489 A | 4/1997 | Cotton et al. | |
| 5,627,829 A | 5/1997 | Gleeson et al. | |
| 5,630,130 A | 5/1997 | Perotto et al. | |
| 5,634,015 A | 5/1997 | Chang et al. | |
| 5,644,623 A | 7/1997 | Gulledge | |
| 5,649,157 A | 7/1997 | Williams | |
| 5,659,687 A | 8/1997 | Kim et al. | |
| 5,671,446 A * | 9/1997 | Rakity et al. | 710/54 |
| 5,680,641 A | 10/1997 | Sidman | |
| 5,684,962 A * | 11/1997 | Black et al. | 709/238 |
| 5,689,566 A | 11/1997 | Nguyen | |
| 5,699,537 A | 12/1997 | Sharangpani et al. | |
| 5,717,898 A | 2/1998 | Kagan et al. | |
| 5,721,870 A | 2/1998 | Matsumoto | |
| 5,742,587 A | 4/1998 | Zornig et al. | |
| 5,742,782 A | 4/1998 | Ito et al. | |
| 5,742,822 A | 4/1998 | Motomura | |
| 5,745,913 A | 4/1998 | Pattin et al. | |
| 5,751,987 A | 5/1998 | Mahant-Shetti et al. | |
| 5,761,507 A | 6/1998 | Govett | |
| 5,761,522 A | 6/1998 | Hisanaga et al. | |
| 5,781,774 A | 7/1998 | Krick | |
| 5,784,649 A | 7/1998 | Begur et al. | |
| 5,784,712 A | 7/1998 | Byers et al. | |
| 5,796,413 A | 8/1998 | Shipp et al. | |
| 5,797,043 A | 8/1998 | Lewis et al. | |
| 5,809,235 A | 9/1998 | Sharma et al. | |
| 5,809,530 A | 9/1998 | Samra et al. | |
| 5,812,868 A | 9/1998 | Moyer et al. | |
| 5,828,746 A | 10/1998 | Ardon | |
| 5,828,863 A | 10/1998 | Barrett et al. | |
| 5,832,215 A | 11/1998 | Kato et al. | |
| 5,835,755 A | 11/1998 | Stellwagen, Jr. | |
| 5,850,395 A | 12/1998 | Hauser et al. | |
| 5,854,922 A | 12/1998 | Gravenstein et al. | |
| 5,860,158 A | 1/1999 | Pai et al. | |
| 5,872,769 A | 2/1999 | Caldara et al. | |
| 5,873,089 A * | 2/1999 | Regache | 707/100 |
| 5,886,992 A | 3/1999 | Raatikainen et al. | |
| 5,887,134 A | 3/1999 | Ebrahim | |
| 5,890,208 A | 3/1999 | Kwon | |
| 5,892,979 A * | 4/1999 | Shiraki et al. | 710/52 |
| 5,893,162 A * | 4/1999 | Lau et al. | 711/153 |
| 5,905,876 A | 5/1999 | Pawlowski et al. | |
| 5,905,889 A | 5/1999 | Wilhelm, Jr. | |
| 5,915,123 A | 6/1999 | Mirsky et al. | |
| 5,937,187 A | 8/1999 | Kosche et al. | |
| 5,938,736 A | 8/1999 | Muller et al. | |
| 5,940,612 A | 8/1999 | Brady et al. | |
| 5,940,866 A | 8/1999 | Chisholm et al. | |
| 5,946,487 A | 8/1999 | Dangelo | |
| 5,948,081 A | 9/1999 | Foster | |
| 5,958,031 A | 9/1999 | Kim | |
| 5,961,628 A | 10/1999 | Nguyen et al. | |
| 5,970,013 A | 10/1999 | Fischer et al. | |
| 5,974,518 A | 10/1999 | Nogradi | |
| 5,978,838 A | 11/1999 | Mohamed et al. | |
| 5,983,274 A | 11/1999 | Hyder et al. | |
| 6,012,151 A | 1/2000 | Mano | |
| 6,014,729 A | 1/2000 | Lannan et al. | |
| 6,023,742 A | 2/2000 | Ebeling et al. | |
| 6,058,168 A | 5/2000 | Braband | |
| 6,067,585 A | 5/2000 | Hoang | |
| 6,070,231 A | 5/2000 | Ottinger | |
| 6,072,781 A | 6/2000 | Feeney et al. | |
| 6,073,215 A | 6/2000 | Snyder | |
| 6,079,008 A | 6/2000 | Clery, III | |
| 6,085,215 A | 7/2000 | Ramakrishnan et al. | |
| 6,085,294 A | 7/2000 | Van Doren et al. | |
| 6,092,127 A | 7/2000 | Tausheck | |
| 6,092,158 A | 7/2000 | Harriman et al. | |
| 6,112,016 A | 8/2000 | MacWilliams et al. | |
| 6,134,665 A | 10/2000 | Klein et al. | |
| 6,141,689 A | 10/2000 | Yasrebi | |
| 6,141,765 A | 10/2000 | Sherman | |
| 6,144,669 A | 11/2000 | Williams et al. | |
| 6,145,054 A | 11/2000 | Mehrotra et al. | |
| 6,157,955 A | 12/2000 | Narad et al. | |
| 6,160,562 A | 12/2000 | Chin et al. | |
| 6,182,177 B1 | 1/2001 | Harriman | |
| 6,195,676 B1 | 2/2001 | Spix et al. | |
| 6,199,133 B1 | 3/2001 | Schnell | |
| 6,201,807 B1 | 3/2001 | Prasanna | |
| 6,212,542 B1 | 4/2001 | Kahle et al. | |
| 6,212,611 B1 | 4/2001 | Nizar et al. | |
| 6,216,220 B1 | 4/2001 | Hwang | |
| 6,223,207 B1 | 4/2001 | Lucovsky et al. | |
| 6,223,238 B1 | 4/2001 | Meyer et al. | |
| 6,223,279 B1 | 4/2001 | Nishimura et al. | |
| 6,247,025 B1 | 6/2001 | Bacon | |
| 6,256,713 B1 | 7/2001 | Audityan et al. | |
| 6,272,616 B1 | 8/2001 | Fernando et al. | |
| 6,275,505 B1 | 8/2001 | OLoughlin et al. | |
| 6,279,113 B1 | 8/2001 | Vaidya | |
| 6,289,011 B1 | 9/2001 | Seo et al. | |
| 6,298,370 B1 | 10/2001 | Tang et al. | |
| 6,307,789 B1 | 10/2001 | Wolrich et al. | |
| 6,320,861 B1 | 11/2001 | Adam et al. | |
| 6,324,624 B1 | 11/2001 | Wolrich et al. | |
| 6,345,334 B1 | 2/2002 | Nakagawa et al. | |
| 6,347,341 B1 | 2/2002 | Glassen et al. | |
| 6,347,344 B1 | 2/2002 | Baker et al. | |
| 6,351,474 B1 * | 2/2002 | Robinett et al. | 370/486 |
| 6,356,962 B1 | 3/2002 | Kasper et al. | |
| 6,359,911 B1 | 3/2002 | Movshovich et al. | |
| 6,360,262 B1 | 3/2002 | Guenthner et al. | |
| 6,373,848 B1 | 4/2002 | Allison et al. | |

| | | |
|---|---|---|
| 6,385,658 B2 | 5/2002 | Harter et al. |
| 6,389,449 B1 | 5/2002 | Nemirovsky et al. |
| 6,393,483 B1 | 5/2002 | Latif et al. |
| 6,393,531 B1 * | 5/2002 | Novak et al. ............... 711/154 |
| 6,415,338 B1 | 7/2002 | Habot |
| 6,426,940 B1 | 7/2002 | Seo et al. |
| 6,426,957 B1 * | 7/2002 | Hauser et al. ............... 370/413 |
| 6,427,196 B1 | 7/2002 | Adiletta et al. |
| 6,430,626 B1 | 8/2002 | Witkowski et al. |
| 6,434,145 B1 | 8/2002 | Opsasnick et al. |
| 6,438,651 B1 * | 8/2002 | Slane ..................... 711/118 |
| 6,463,072 B1 | 10/2002 | Wolrich et al. |
| 6,522,188 B1 | 2/2003 | Poole |
| 6,523,060 B1 | 2/2003 | Kao |
| 6,532,509 B1 | 3/2003 | Wolrich et al. |
| 6,539,024 B1 | 3/2003 | Janoska et al. |
| 6,552,826 B2 | 4/2003 | Adler et al. |
| 6,560,667 B1 | 5/2003 | Wolrich et al. |
| 6,577,542 B2 | 6/2003 | Wolrich et al. |
| 6,584,522 B1 | 6/2003 | Wolrich et al. |
| 6,587,906 B2 | 7/2003 | Wolrich et al. |
| 6,606,704 B1 | 8/2003 | Adiletta et al. |
| 6,625,654 B1 | 9/2003 | Wolrich et al. |
| 6,631,430 B1 | 10/2003 | Wolrich et al. |
| 6,631,462 B1 | 10/2003 | Wolrich et al. |
| 6,658,546 B2 | 12/2003 | Calvignac et al. |
| 6,661,794 B1 | 12/2003 | Wolrich et al. |
| 6,667,920 B2 | 12/2003 | Wolrich et al. |
| 6,668,317 B1 | 12/2003 | Bernstein et al. |
| 6,681,300 B1 | 1/2004 | Wolrich et al. |
| 6,684,303 B2 * | 1/2004 | LaBerge .................... 711/154 |
| 6,687,247 B1 | 2/2004 | Wilford et al. |
| 6,694,380 B1 | 2/2004 | Wolrich et al. |
| 6,724,721 B1 | 4/2004 | Cheriton |
| 6,728,845 B2 | 4/2004 | Adiletta et al. |
| 6,731,596 B1 | 5/2004 | Chiang et al. |
| 6,754,223 B1 | 6/2004 | Lussier et al. |
| 6,757,791 B1 * | 6/2004 | O'Grady et al. ............. 711/154 |
| 6,768,717 B1 | 7/2004 | Reynolds et al. |
| 6,779,084 B2 * | 8/2004 | Wolrich et al. .............. 711/118 |
| 6,791,989 B1 | 9/2004 | Steinmetz et al. |
| 6,795,447 B2 | 9/2004 | Kadambi et al. |
| 6,804,239 B1 | 10/2004 | Lussier et al. |
| 6,810,426 B2 * | 10/2004 | Mysore et al. .............. 709/234 |
| 6,813,249 B1 * | 11/2004 | Lauffenburger et al. ..... 370/253 |
| 6,816,498 B1 | 11/2004 | Viswanath |
| 6,822,958 B1 | 11/2004 | Branth et al. |
| 6,822,959 B2 | 11/2004 | Galbi et al. |
| 6,842,457 B1 | 1/2005 | Malalur |
| 6,850,999 B1 | 2/2005 | Mak et al. |
| 6,868,087 B1 | 3/2005 | Agarwala et al. |
| 6,888,830 B1 | 5/2005 | Snyder, II et al. |
| 6,975,637 B1 | 12/2005 | Lenell |
| 2001/0014100 A1 | 8/2001 | Abe et al. |
| 2002/0131443 A1 * | 9/2002 | Robinett et al. ............. 370/442 |
| 2002/0144006 A1 * | 10/2002 | Cranston et al. ............ 709/312 |
| 2002/0196778 A1 | 12/2002 | Colmant et al. |
| 2003/0041216 A1 | 2/2003 | Rosenbluth et al. |
| 2003/0046488 A1 | 3/2003 | Rosenbluth et al. |
| 2003/0110166 A1 * | 6/2003 | Wolrich et al. ................ 707/3 |
| 2003/0115347 A1 * | 6/2003 | Wolrich et al. .............. 709/230 |
| 2003/0115426 A1 * | 6/2003 | Rosenbluth et al. ......... 711/154 |
| 2003/0131022 A1 | 7/2003 | Wolrich et al. |
| 2003/0131198 A1 * | 7/2003 | Wolrich et al. .............. 711/136 |
| 2003/0140196 A1 | 7/2003 | Wolrich et al. |
| 2003/0147409 A1 | 8/2003 | Wolrich et al. |
| 2004/0039895 A1 | 2/2004 | Wolrich et al. |
| 2004/0054880 A1 | 3/2004 | Bernstein et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0098496 A1 | 5/2004 | Wolrich et al. |
| 2004/0109369 A1 | 6/2004 | Wolrich et al. |
| 2004/0179533 A1 * | 9/2004 | Donovan .................. 370/395.5 |

FOREIGN PATENT DOCUMENTS

| | | |
|---|---|---|
| EP | 0418447 * | 3/1991 |
| EP | 0 464 715 | 1/1992 |
| EP | 0 633 678 | 1/1995 |
| EP | 0 745 933 | 12/1996 |
| EP | 0760501 A1 * | 3/1997 |
| EP | 0 809 180 | 11/1997 |
| JP | 59-111533 | 6/1984 |
| WO | WO 94/15287 | 7/1994 |
| WO | WO 97/38372 | 10/1997 |
| WO | WO 98/25210 * | 6/1998 |
| WO | WO 01/15718 | 3/2001 |
| WO | WO 01/16769 | 3/2001 |
| WO | WO 01/16770 | 3/2001 |
| WO | WO 01/16782 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO 03/017541 A1 * | 2/2003 |

OTHER PUBLICATIONS

Heidi Pan et al., "Heads and Tails: A variable-length instruction format supporting parallel fetch and decode", Cases 01, Nov. 16-17, 2001, eight pages.*

G.Kornaros et al. "A fully-programmable memory management system optimizing queue handling at multi gigabit rates", DAC 2003, ACM pp. 54-59.*

Sivarama P Dandamudi, "multiprocessors", IEEE computer, Mar. 1997, pp. 82-89.*

Maged M Michael ; "scalable lock-free dynamic memory allocation", PLDI,'04, ACM, Jun. 2004, pp. 1-12.*

Sailesh Kumar et al. "A scalable, cache-based queue management subsystem for network processors", no date, pp. 1-7.*

Alper Buyuktosunoglu et al. "tradeoffs in power-efficient issue queue design", ISLPED'02, ACM, Aug. 2002, 6 pages.*

Mathew Adiletta et al. "The next generation of Intel IXP network processors", 2002, pp. 6-18.*

Henk Jonkers, "queueing models of shared-memory parallel applications", computer and telecommunication systems performance engineering, 13 pages.*

Lorraine McLuckie et al. using the RapidIO messaging Unit on power QUICC III, freescale semiconductor,Inc,2004 Rev 1, pp. 1-19.*

Tatyana Y Lymar et al. "data streams organization in query executor for parallel DBMS", no date, 4 pages.*

Danny Hendler et al. "work dealing", SPAA '02, ACM, Aug. 2002, pp. 164.*

Michael L Scott,"non-blocking timeout in scalable queue-based spin locks",PODC,2002, ACM, Jul. 2002, pp. 31-40.*

Mathew Adiletta et al. "the next generation of Intel IXP Network processors", Intel technology journal, network processors, vol. 6, issue:03, published Aug. 15, 2002, pp. 6-18.*

G.Kornaros, et al. "A fully-programmable memory management system optimizing queue handling at multi Gigabit rates", ACM, Jun. 2-6, 2003, pp. 54-59.*

Byrd et al., "Multithread Processor Architectures," *IEEE Spectrum*, vol. 32, No. 8, New York, Aug. 1, 1995, pp. 38-46.

Doyle et al., *Microsoft Press Computer Dictionary*, $2^{nd}$ ed., Microsoft Press, Redmond, Washington, USA, 1994, p. 326.

U.S. Appl. No. 09/475,614, filed Dec. 1999, Wolrich, et al.

U.S. Appl. No. 09/473,571, filed Dec. 1999, Wolrich, et al.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5$^{th}$ Annual IEEE Symposium on Field-Programmable Custom Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28$^{th}$ Annual Hawaii International Conference on System Sciences, 1995, pp. 191-201.

Trimberger et al, "A time-multiplexed FPGA," Proceedings of the 5$^{th}$ Annual IEEE Symposium on Field-Programmable Custom Computing Machines, pp. 22-28, 1998.

Turner et al., "Design of a High Performance Active Router," Internet Document, *Online*, pp. 1- 20, Mar. 18, 1999.

Vibhatavanij et al., "Simultaneous Multithreading-Based Routers," Proceedings of the 2000 International Conference of Parallel Processing, Toronto, Ontario, Canada, Aug. 21-24, 2000, pp. 362-369.

Wazlowski et al., "PRSIM-II computer and architecture," IEEE Proceedings, Workshop on FPGAs for Custom Computing Machines, 1993.

\* cited by examiner

QUEUE ARRAYS IN NETWORK DEVICES

BACKGROUND

This invention relates to utilizing queue arrays in network devices.

Some network devices such as routers and switches have line speeds that can be faster than 10 Gigabits. For maximum efficiency the network devices' processors should be able to process data packets, including storing them to and retrieving them from memory at a rate at least equal to the line rate. However, current network devices may lack the necessary bandwidth between their processors and memory to process data packets at the devices' line speeds.

BRIEF SUMMARY

A queue descriptor including a head pointer pointing to a first element in a queue and a tail pointer pointing to a last element in the queue is stored in a memory. In response to a command to perform an enqueue or dequeue operation with respect to the queue, one of either the head pointer or tail pointer is fetched from the memory to a cache. Portions of the queue descriptor modified by the operation are returned to the memory from the cache.

DETAILED DESCRIPTION

Figure 1:
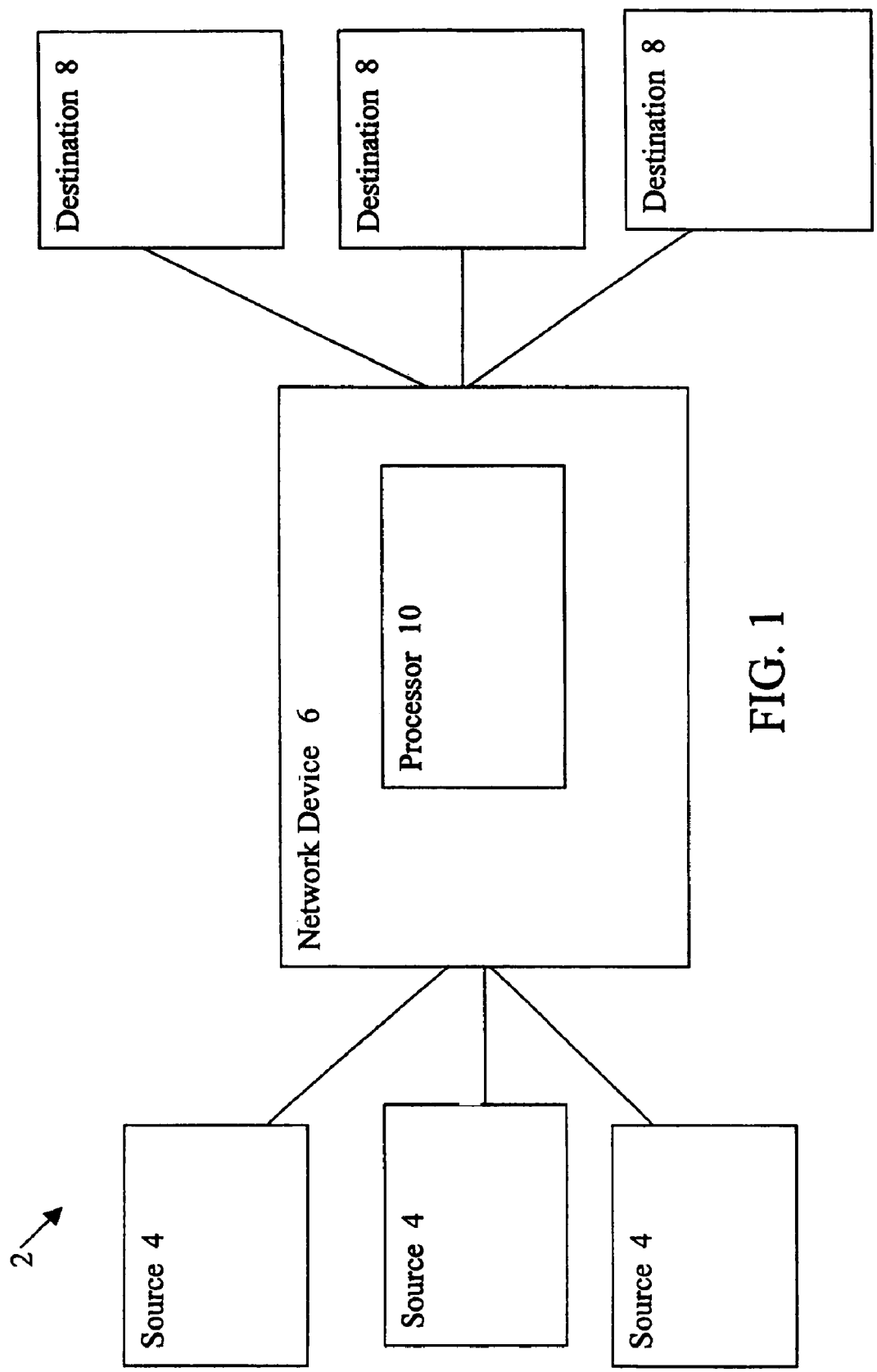
FIG. 1 is a block diagram of a network system.

As shown in FIG. 1, a network system 2 for processing data packets includes sources of data packets 4 coupled to a network device 6 and destinations for data packets 8 coupled to the network device 6. The network device 6 includes a processor 10 with memory data structures configured to receive, store and forward the data packets to a specified destination. The network device 6 can include a network switch, a network router or other network device. The source of data packets 4 can include other network devices connected over a communications path operating at high data packet transfer line speeds. Examples of such communications paths include an optical carrier (OC)-192 line, and a 10-Gigabit line. Likewise, the destination 8 of data packets also can include other network devices as well as a similar network connection.

Figure 2:
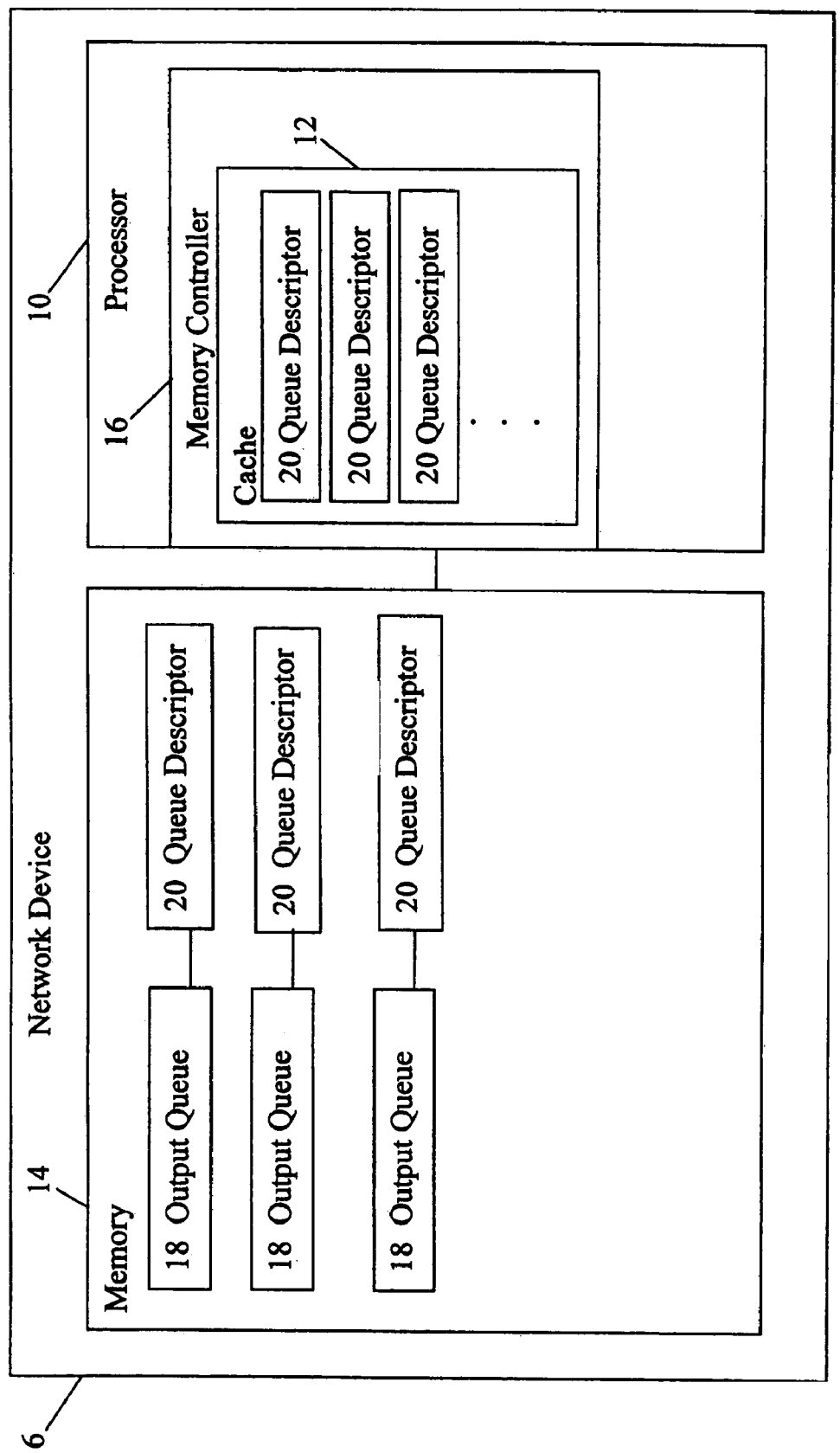
FIG. 2 is a block diagram of a network device.

As shown in FIG. 2 the network device 6 includes memory 14 coupled to the processor 10. The memory 14 stores output queues 18 and their corresponding queue descriptors 20. Upon receiving a data packet from a source 4 (FIG. 1), the processor 10 performs enqueue and dequeue operations to process the packet. An enqueue operation adds information that has arrived in a data packet, which previously was stored in memory 14, to one of the output queues 18 and updates its corresponding queue descriptor 20. A dequeue operation removes information from one of the output queues 18 and updates the corresponding queue descriptor 20, thereby allowing the network device 6 to transmit the information to an appropriate destination 8.

Figure 3:
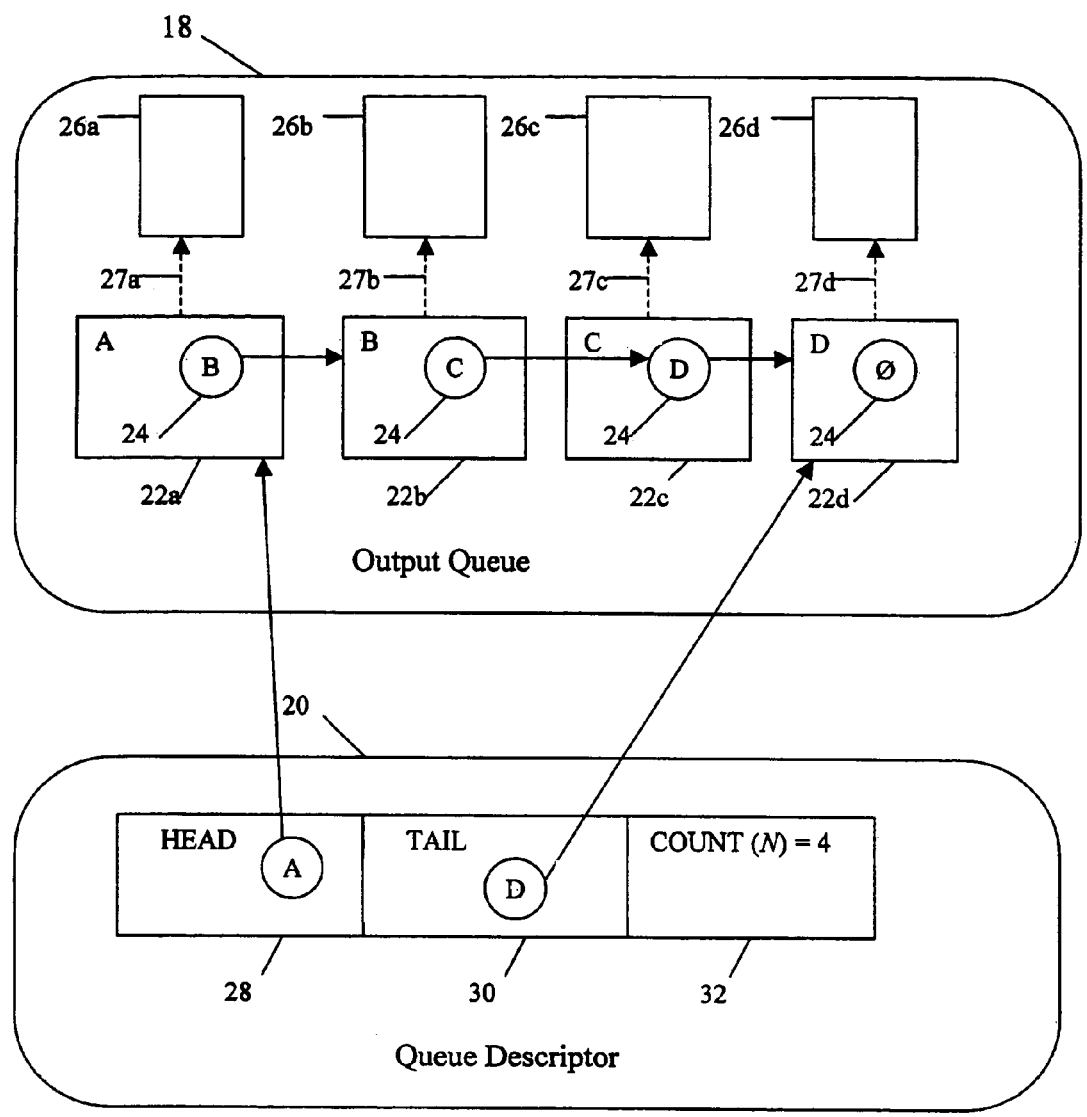
FIG. 3 shows a queue and queue descriptor.

An example of an output queue 18 and its corresponding queue descriptor is shown in FIG. 3. The output queue 18 includes a linked list of elements 22, each of which contains a pointer 24 to the next element 22 in the output queue 18. A function of the address of each element 22 implicitly maps to the information 26 stored in the memory 14 that the element 22 represents. For example, the first element 22a of output queue 18 shown in FIG. 3 is located at address A. The location in memory of the information 26a that element 22a represents is implicit from the element's address A, illustrated by dashed arrow 27a. Element 22a contains the address B, which serves as a pointer 24 to the next element 22b in the output queue 18, located at address B.

The queue descriptor 20 includes a head pointer 28, a tail pointer 30 and a count 32. The head pointer 28 points to the first element 22 of the output queue 18, and the tail pointer 30 points to the last element 22 of the output queue 18. The count 32 identifies the number (N) of elements 22 in the output queue 18.

Enqueue and dequeue operations for a large number of output queues 18 in memory 14 at high bandwidth line rates can be accomplished by storing some of the queue descriptors 20 in a cache 12 at the processor's 10 memory controller 16 (FIG. 2). Commands to perform enqueue or dequeue operations reference queue descriptors 20 presently stored in the cache 12. When an enqueue or a dequeue operation is required with respect to a queue descriptor 20 that is not presently in the cache 12, the processor 10 issues commands to the memory controller 16 to remove a queue descriptor 20 from the cache 12 to the memory 14 and to fetch a new queue descriptor 20 from memory 14 for storage in the cache 12. In this manner, modifications to a queue descriptor 20 made by enqueue and dequeue operations occur in the cache 12 and are copied to the corresponding queue descriptor 20 in memory 14 upon removal of that queue descriptor 20 from the cache 12.

In order to reduce the read and write operations between the cache 12 and the memory 14, it is possible to fetch and return only those parts of the queue descriptor 20 necessary for the enqueue or dequeue operations.

Figure 4:
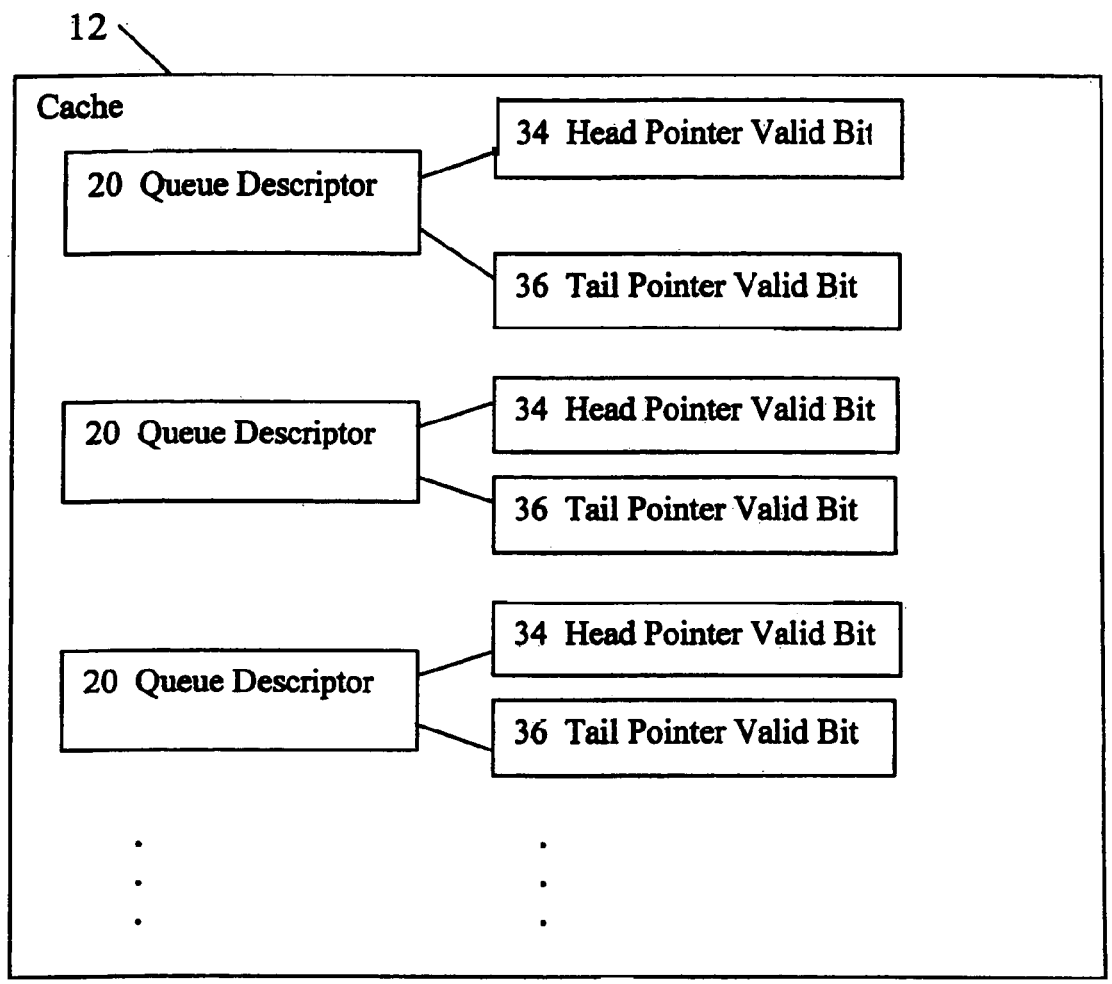
FIG. 4 is a block diagram of a network processor's cache.

FIG. 4 illustrates the contents of the cache 12 used to accomplish this function according to one particular implementation. In addition to a number of queue descriptors 20 corresponding to some of the queue descriptors stored in the memory 14, the cache 12 designates a head pointer valid bit 34 and a tail pointer valid bit 36 for each queue descriptor 20 it stores. The valid bits are set when the pointers to which they correspond are modified while stored in the cache 12. The cache 12 also tracks the frequency with which queue descriptors have been used. When a command requires the removal of a queue descriptor, the least-recently-used ("LRU") queue descriptor 20 is returned to memory 14.

Figure 5:
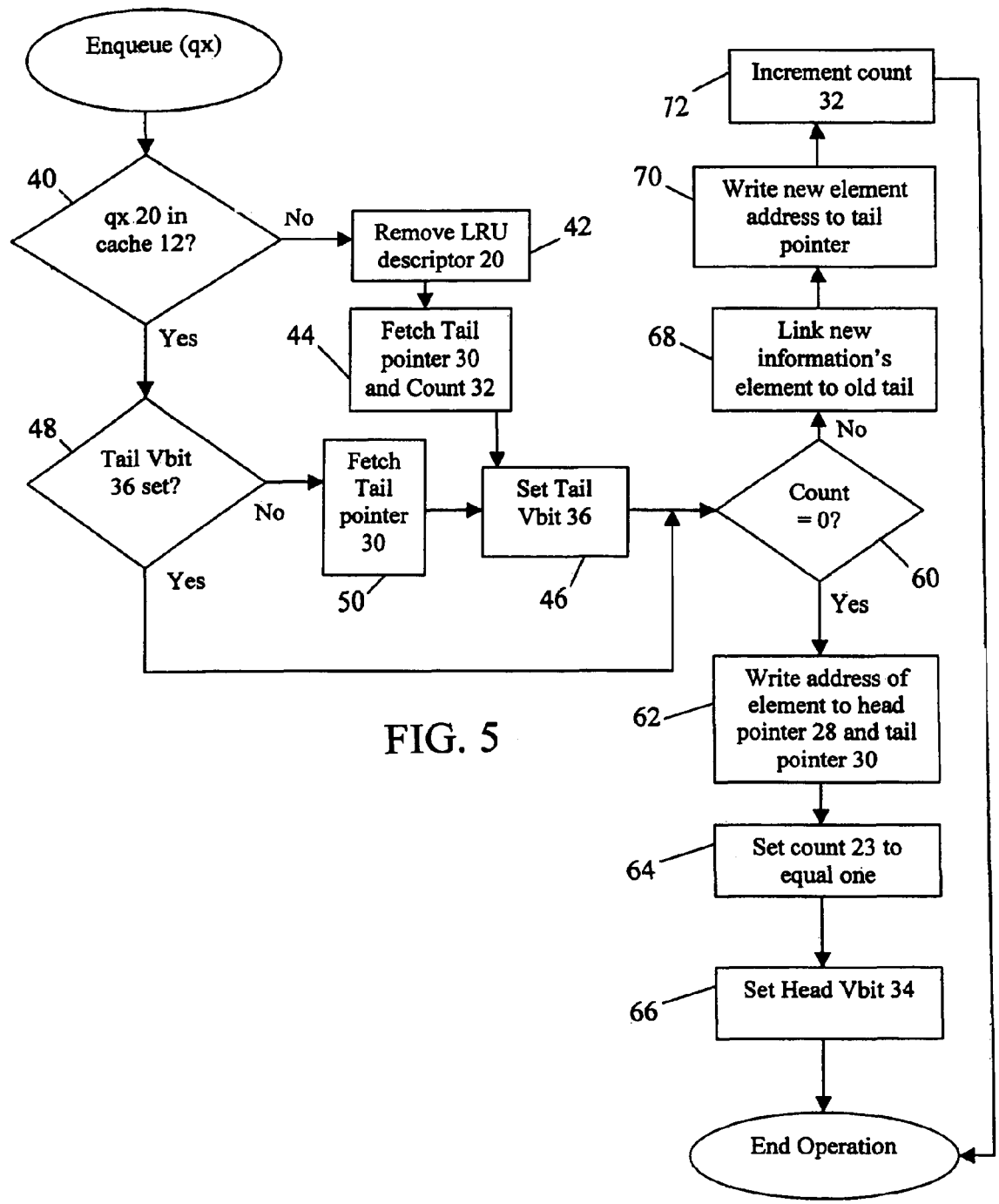
FIG. 5 is a flow chart illustrating an enqueue operation.

As illustrated by FIG. 5, when performing an enqueue operation, the processor 10 checks 40 if a queue descriptor 20 for the particular queue 18 to which the information will be attached is in the cache 12. If it is not, the processor 10 removes 42 the least-recently-used queue descriptor 20 from the cache 12 to make room for the requested queue descriptor. The tail pointer 30 and count 32 of the requested queue descriptor 20 are fetched 44 from memory 14 and stored in the cache 12, and the tail pointer valid bit (Vbit) 36 is set 46. The processor 10 then proceeds with the enqueue operation at block 60.

If (at block 40) the queue descriptor 20 for the particular requested queue 18 is already in the cache 12, the processor 10 checks 48 whether the tail pointer valid bit 36 has been set. If it has not been set, the tail pointer 30 is fetched 50 from memory 14 and stored in the queue descriptor 20 in the cache 12, and the tail pointer valid bit 36 is set 46. The processor 10 then proceeds with the enqueue operation at block 60. If (at block 48) the tail pointer valid bit 36 has been set, the processor proceeds directly to the enqueue operation at block 60.

In block 60, the processor 10 determines whether the output queue 18 is empty by checking if the count 32 is set to zero. If the count 32 is set to zero, the output queue 18 is empty (it has no elements 22 in it). The address of the new element 22 which implicitly maps to the new information 26, the information 26 being already in the memory 14, is written 62 in both the head pointer 28 and tail pointer 30 in the cache 12 as the new (and only) element 22 in the output queue 18. The count 32 is set 64 to equal one and the head pointer valid bit is set 66.

If (at block 60) the count 32 is not set to zero and the output queue 18 is, therefore, not empty, the processor links 68 the address of the new information's 26 element 22 to the pointer 24 of the last element 22. Thus the pointer 24 of the last element 22 in the queue 18 points to a new element 22 representing the new information 26. The processor 10 writes 70 the address of this new element 22 to the tail pointer 30 of the queue descriptor 20 in the cache 12. The processor 10 increments 72 the count by one and the Enqueue operation is then complete.

Figure 6:
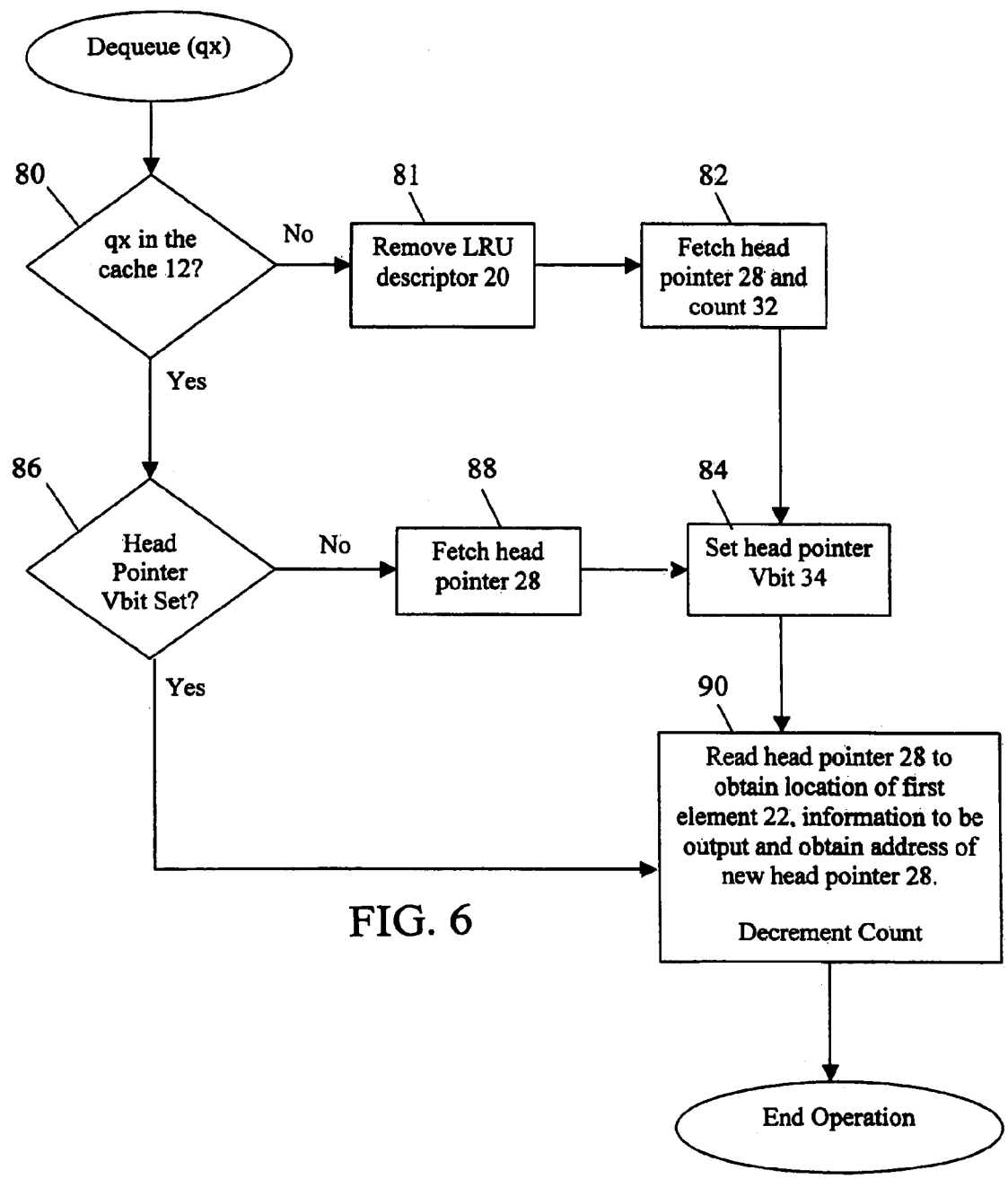
FIG. 6 is a flow chart illustrating a dequeue operation.

FIG. 6 illustrates a dequeue operation. The processor 10 checks 80 whether the queue descriptor 20 for the particular output queue to be used in the dequeue operation is presently in the cache 12. If it is not, the processor 10 removes 81 a queue descriptor from the cache 12 to make room for the requested queue descriptor 20. The processor 10 then fetches 82 the head pointer 28 and count 32 of the requested queue descriptor 20 from memory 14, stores them in the cache 12 and sets 84 the head pointer valid bit (Vbit). The processor 10 proceeds with the dequeue operation at block 90.

If (at block 80) the queue descriptor 20 for the particular output queue 18 requested is already in the cache 12, the processor checks 86 whether the head pointer valid bit 34 has been set. If it has not been set, the head pointer 28 is fetched 88 and the processor 10 proceeds with the dequeue operation at block 90. If the head pointer valid bit 34 has been set, the processor 10 proceeds directly to the dequeue operation at block 90.

In block 90, the head pointer 28 is read to identify the location in memory 14 of the first element 22 in the output queue 18. The information implicitly mapped by the element's 22 address is to be provided as output. That element 22 is also read to obtain the address of the next element 22 in the output queue 18. The address of the next element 22 is written into the head pointer 28, and the count 32 is decremented.

The head pointer 28 need not be fetched during an enqueue operation, thereby saving read bandwidth between the processor 10 and memory 14. Similarly, a tail pointer 30 need not be fetched from memory 14 during a dequeue operation. When a queue descriptor 20 is removed 42, 81 from the cache 12, the processor 10 checks the valid bits 34, 36. If there were no modifications to the tail pointer 30 (for example, when only dequeue operations were performed on the queue), the tail pointer valid bit 36 remains unset. This indicates that write bandwidth can be saved by writing back to memory 14 only the count 32 and head pointer 28. If there were no modifications to the head pointer 28 (for example, when only enqueue operations to a non-empty output queue 18 were performed), the head pointer valid bit 34 remains unset. This indicates that only the count 32 and tail pointer 30 need to be written back to the queue descriptor 20 in memory 14, thus saving write bandwidth.

Figure 7:
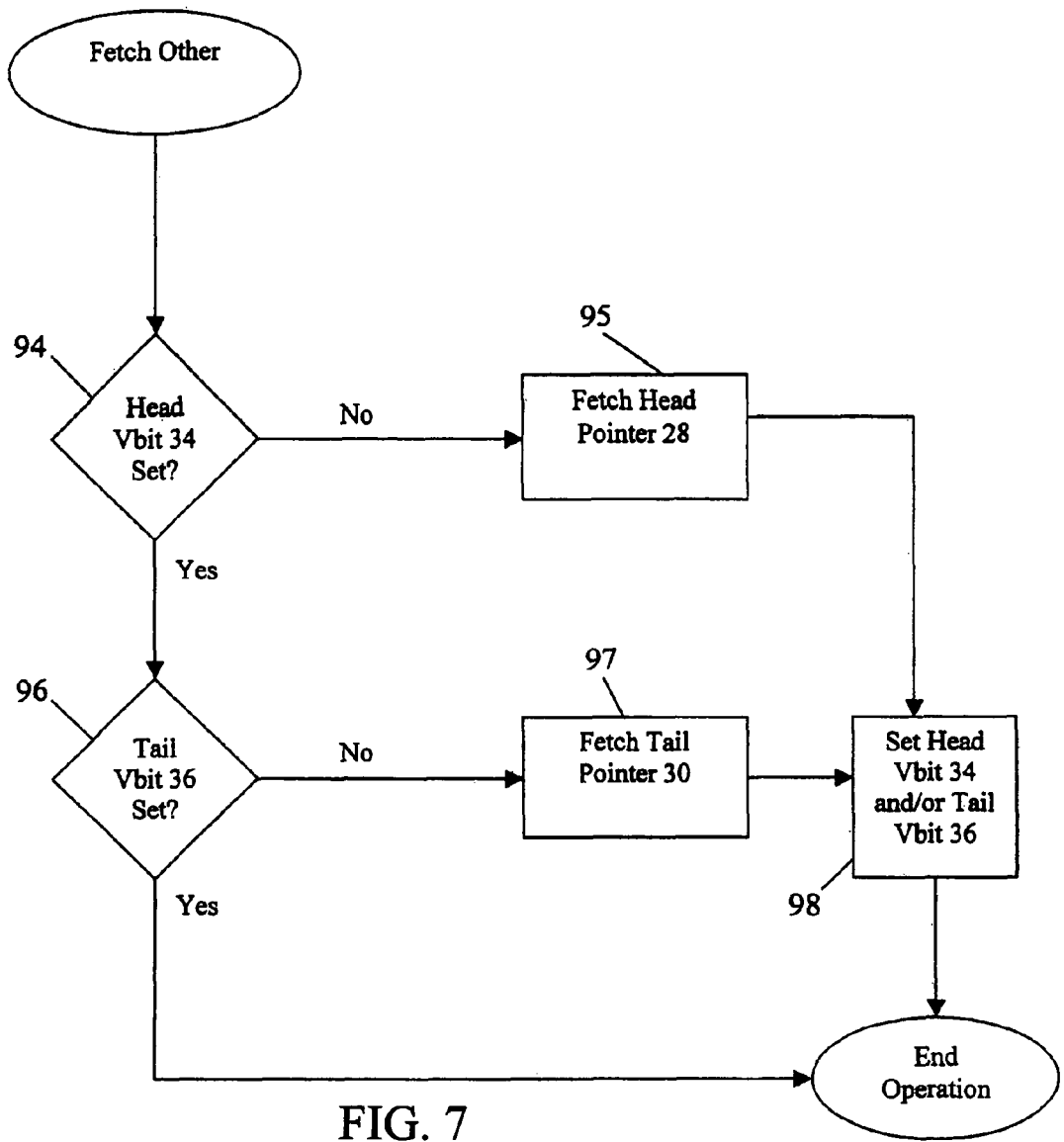
FIG. 7 is a flow chart illustrating a fetch operation.

In some implementations, when a particular queue descriptor 20 is used in the cache 12 for a second time, a "fetch other" operation is executed before the enqueue or dequeue operation. As shown by FIG. 7, one implementation of the "fetch other" operation 94 causes the processor 10 to determine 94 whether the head pointer valid bit 34 has been set and to fetch 95 the head pointer 28 from memory 14 if it has not. If the head valid bit 34 has been set, the processor 10 checks 96 whether the tail valid bit 36 has been set and, if it has not, fetches 97 the tail pointer 30. At completion of the "fetch other" operation, both the head valid bit 34 and the tail valid bit 36 are set 98.

The use of both pointers is needed only if the second enqueue or dequeue operation with respect to the queue descriptor 20 is not the same as the first such operation. However excess bandwidth to support this possibly superfluous fetch and return of queue descriptor 20 parts 28, 30 can be available when the queue descriptor is used by operations more than once while stored in the cache 12.

Various features of the system can be implemented in hardware, software or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read only memory (ROM) readable by a general or special purpose programmable computer, for configuring and operating the computer when the storage medium is read by the computer to perform the functions described above.

Other implementations are within the scope of the following claims.

What is claimed is:

1. A method comprising:
storing in memory a queue descriptor for a queue, the queue descriptor including a count identifying a number of elements in the queue, a head pointer pointing to a first element in the queue and a tail pointer pointing to a last element in the queue;
in response to a command to perform an enqueue or dequeue operation with respect to the queue, fetching from the memory to a cache the count and one of either the head pointer or tail pointer; and
returning to the memory from the cache portions of the queue descriptor modified by the operation.

2. The method of claim 1 including fetching the count and the head pointer and not the tail pointer in response to a command to perform a dequeue operation; or fetching the count and the tail pointer and not the head pointer in response to a command to perform an enqueue operation.

3. A method comprising:
determining whether a head pointer or a tail pointer of a queue descriptor that was fetched from memory to a cache in response to an enqueue or dequeue operation on a queue had been modified by the enqueue or dequeue operation; and
returning a count identifying a number of elements in the queue and one of either the head pointer or tail pointer to the memory from the cache only if that pointer had been modified.

4. An apparatus comprising:
memory for storing queue descriptors which include a count identifying a number of elements in a queue, a head pointer pointing to a first element in the queue and a tail pointer pointing to a last element in the queue;

a cache for storing queue descriptors corresponding to up to a number of the memory's queue descriptors; and a processor configured to:

fetch from the memory to the cache the count and one of either the head pointer or the tail pointer of a particular queue descriptor in response to a command to perform an enqueue or a dequeue operation with respect to the particular queue descriptor; and return to the memory from the cache portions of the queue descriptor modified by the operation.

5. The apparatus of claim 4 wherein the processor is configured to fetch the count and the head pointer and not the tail pointer in response to a command to perform a dequeue operation; or fetch the count and the tail pointer and not the head pointer in response to a command to perform an enqueue operation.

6. An article comprising a computer-readable medium that stores computer-executable instructions for causing a computer system to:

store in memory a queue descriptor including a count identifying a number of elements in a queue, a head pointer pointing to a first element in the queue and a tail pointer pointing to a last element in the queue;

in response to a command to perform an enqueue or dequeue operation with respect to a queue, fetch from memory to a cache the count and one of either a head pointer pointing to a first element in the queue or a tail pointer pointing to a last element in the queue; and return to the memory from the cache the portions of the queue descriptor modified by the operation.

7. The article of claim 6 including instructions to cause the computer system to:

fetch the count and the head pointer and not the tail pointer in response to a command to perform a dequeue operation; or fetch the count and the tail pointer and not the head pointer in response to a command to perform an enqueue operation.

\* \* \* \* \*